United States Patent Office 3,262,753
Patented July 26, 1966

3,262,753
UTILIZATION OF WASTE GAS AND WASTE SODA LIQUID IN OIL REFINERY
Yasuo Urano and Katsuo Watanabe, Okayama, Japan, assignors to Nagao Soda Co., Ltd., Okayama, Japan
No Drawing. Filed Nov. 8, 1961, Ser. No. 150,871
4 Claims. (Cl. 23—134)

This invention relates to an economical full-utilization method of disposing of hydrogen sulphide in waste gas and of disposing of waste caustic soda liquid in oil refineries. In the petroleum refinery crude oil is made into gasoline, kerosene, light oil, heavy oil and synthetic chemical gases through the processes of distillation, cracking, reforming, isomerization, polymerization, alkylation, desulfurization and coking. In refining crude oil as above mentioned, harmful impurities are removed by being absorbed into oil detergents such as sulfuric acid and caustic soda. When caustic soda has absorbed enough impurities, it is disposed of as waste. But this waste caustic soda contains large amounts of harmful, waste organic matter and reducing agents such as sodium sulfide, sodium hydro-sulfide, mercaptans, phenols (phenol, cresol, xylenol), thiophenols (thiophenol, thiocresol, thioxylenol) etc. If such poisonous matter is exhausted out of the factory without treatment, it is harmful not only to public sanitation but also to the fishing and the agricultural industries. Today the waste caustic soda is neutralized with the waste sulfuric acid before the former is exhausted out of the factory. In this case the public damages are lessened but not fully prevented.

The object of this invention is to provide a method by which the waste caustic soda together with hydrogen sulfide exhausted from the refining process are rendered harmless and the available ingredients are recovered from the waste caustic soda.

Waste caustic soda has some variation in its composition according to the place of extraction. For instance, a composition of waste caustic soda which is extracted at a place where oil is cleaned is shown in Table 1.

Table 1

|  | Percent |
|---|---|
| NaOH | 11.50 |
| $Na_2S$ | 3.80 |
| $Na_2CO_3$ | 0.46 |
| Mercaptans | 2.41 |
| Phenols | 14.30 |

Its composition at a place where gas is cleaned is shown in Table 2.

Table 2

|  | Percent |
|---|---|
| NaSH | 2.70 |
| NaOH | 6.50 |
| $Na_2CO_3$ | 1.98 |
| $Na_2SO_3$ | 0.79 |
| $Na_2S_2O_3$ | 0.69 |
| Oil (Mercaptans and phenols) | 5.82 |

The inventors have examined the reaction between caustic soda and hydrogen sulfide and have found that there are two courses in the reaction:

$$NaOH + H_2S = NaSH + H_2O \qquad (1)$$
$$2NaOH + H_2S = Na_2S + 2H_2O \qquad (2)$$

The Equation 1 is the case where 1 mol of caustic soda and 1 mol of hydrogen sulfide are reacted, and the Equation 2 is the case where 2 mols of caustic soda and 1 mol of hydrogen sulfide are reacted.

When sodium hydro-sulfide and caustic soda are reacted:

$$NaSH + NaOH = Na_2S + H_2O \qquad (3)$$

When hydrogen sulfide is absorbed into sodium sulfide:

$$Na_2S + H_2S = NaSH \qquad (4)$$

From the above equations it is seen that $Na_2S$ is obtained when NaOH is in the liquid, and NaSH is obtained when $H_2S$ is in the liquid and that the liquid still has the capacity for absorbing $H_2S$ when there is $Na_2S$ in the liquid.

It was thought that the waste caustic soda shown in Table 1 might have sufficient capacity to absorb $H_2S$, and so the liquid was made to absorb $H_2S$ until it was saturated or supersaturated.

The result was that NaOH and $Na_2S$ in the waste caustic soda liquid were turned into NaSH and since the water content of the solution which was responsible for dissolving said NaSH was saturated with $H_2S$, the water did not dissolve the ordinarily water-soluble oil contents such as mercaptans, phenols and thiophenols which remained at the bottom, while the remaining oil contents were clearly separated from said water content and floated to the surface. The actual composition of the above mentioned solutions according to examination is as below—

Mixed waste caustic soda: Kg.
  Specific gravity, 1.132/15° C. _____ 100
Separated oil:
  Specific gravity, 1.038/15° C. _____ 150~180
Sodium hydro sulfide solution:
  Specific gravity, 1.118/15° C. _____ 920~950

That is, 1000 kg. of waste caustic soda was increased to 1100 kg. because of the absorbed hydrogen sulfide, and the sodium hydrosulfide solution separated at the bottom was concentrated by heating to sodium hydro-sulfide, the analysis of which was as follows:

|  | Percent |
|---|---|
| NaSH | 72.55 |
| $Na_2S$ | 4.65 |
| $Na_2S_2O_3$ | 1.11 |
| $Na_2SO_3$ | 0.65 |
| $Na_2CO_3$ | 0.71 |
| $Fe_2O_3 + Al_2O_3$ | 0.001 |
| Insoluble materials | 0.005 |
| Water | Remainder |

The condensed product was as high in quality as sodium hydro-sulfide now commercially available, though it is subject to a degree of variation in its composition and component percentage according to the composition of waste caustic soda.

The harmful oils which floated had the approximate composition shown in the following composition analysis:

|  | Percent |
|---|---|
| Phenols (phenol, cresol, xylenol etc.) | 20~40 |
| Thiophenols (thiophenol, thiocresol, thioxylenol) | 40~60 |
| Mercaptans (the result of ultra-violet spectrometry) | 2~10 |

The above oils can be utilized as organic chemical industrial materials. These oils are preferably used, however, as fuel in concentrating sodium hydro-sulfide solution in the previously mentioned process. In case it is burned as fuel, the harmful materials are turned into carbon dioxide, water and a small quantity of sulphur dioxide so that the public damage due to waste caustic soda and waste hydrogen sulfide may be nearly completely prevented, and in addition, a high quality sodium hydrosulfide is obtained without using a valuable starting material.

The direct treating process of H₂S in waste gas and waste caustic soda which are composed as shown in Table 1 is mentioned above. But in case the waste caustic soda has the composition as shown in Table 2, it may be of little efficacy to try to have waste gas containing $H_2S$ absorbed into this waste liquid because its absorbing capacity for $H_2S$ and other waste gases is already lowered to a considerable degree.

In order to treat the waste liquid as shown in Table 2, an oxide or hydroxide of Ca or Ba (as Ca is generally preferable, the case of Ca is described in this specification) is firstly added, in a little excessive quantity, to the waste liquid and then heated to achieve reaction, since the waste liquid contains $Na_2CO_3$, $Na_2SO_3$, $Na_2S_2O_3$ and the like which have absorbed $CO_2$, $SO_2$ and the like being in the waste gas. In this case $Na_2S$ in the original waste liquid has to be transferred to NaSH before a Ca compound is added.

Then a caustification occurs as shown in the following equation:

$$2NaSH + Ca(OH)_2 = 2NaOH + Ca(SH)_2 \quad (5)$$
$$Na_2CO_3 + Ca(OH)_2 = 2NaOH + CaCO_3 \quad (6)$$
$$Na_2SO_3 + Ca(OH)_2 = 2NaOH + CaSO_3 \quad (7)$$
$$Na_2S_2O_3 + Ca(OH)_2 = 2NaOH + CaS_2O_3 \quad (8)$$

The resulting solution contains caustic soda and calcium hydro-sulfide together with a small quantity of $CaCO_3$, $CaSO_3$ and $CaS_2O_3$ precipitates. After eliminating the precipitates, $H_2S$ is absorbed into the liquid beyond the saturation point. Then the following reactions occur:

$$NaOH + H_2S = 2NaSH + H_2O \quad (9)$$
$$Ca(OH)_2 + 2H_2S = Ca(SH)_2 + 2H_2O \quad (10)$$

The oil contents float and two layers are formed, upper and lower, for the same reason as mentioned previously. After the upper layer is removed, $Na_2SO_4$ is added by the equivalent to $Ca(SH)_2$ in the lower layer.

$$Ca(SH)_2 + Na_2SO_4 = 2NaSH + CaSO_4$$

It is not always necessary to do the caustification prior to adding $Na_2SO_4$ as described above, but it is also efficient to make the said two reactions at the same time. It can be said from our experiments on the present waste caustic soda treating process that, if there is waste $H_2S$ in excess of that necessary for the original waste liquid, a correspondingly greater quantity of lime or slaked lime added to it will treat the entire quantity of $H_2S$. Our experiments further indicate that over 98% of the organic matter oils in the waste liquid are separated and recovered irrespective of the added quantity of lime. Therefore, there remain no oils in the solution which contains, as a main component sodium hydro-sulfide. Further, according to the present waste caustic soda treating process, a by-product of high-quality sodium hydro-sulfide is obtained.

The floating organic matter oils have the composition mentioned previously and they are useful as organic chemical industrial materials or they can be burned as fuel without any treatment.

Now here is an example where the above-mentioned process for treating waste caustic soda is described in detail. We used the waste liquid whose composition is shown in Table 2. First, 1000 kg. of the waste liquid was mixed in a tank with emulsified hydrate of lime 58.6 kg. (purity: 98%) in 200 kg. water. Then the content was heated to caustify inorganic sodium salts in the original waste liquid, while $H_2S$ was absorbed beyond the saturation point into said liquid. The liquid was then separated into two layers. The weight of the liquid after removing the upper-layer oils was 57.2 kg. The lower layer was filtered to remove 34.5 kg. precipitant (mainly insoluble calcium salts). To the filtered liquid was then added 250 kg. of $Na_2SO_4 \cdot 10H_2O$. After agitating with heating, the remaining $Ca(SH)_2$ was converted to NaSH, and about 215 kg. of $CaSO_4 \cdot 2H_2O$ was obtained, which was filtered away, and finally about 1200 kg. of NaSH was obtained.

Said upper-layer floating oils were subjected to ultraviolet spectrometry analysis with the result as below:

| | Percent |
|---|---|
| Phenols (phenol, cresol, xylenol etc.) | 40 |
| Thiophenols (thiophenol, thiocresol, thioxylenol, etc.) | 55 |
| Remainder | 5 |

The analysis result of the lower layer solution is as follows:

| | Percent |
|---|---|
| NaSH | 19.8 |
| NaDH | Below 0.00 |
| $Na_2CO_3$ | 0.15 |
| $Na_2SO_3$ | 0.10 |
| $Na_2SO_4$ | 0.83 |
| $Na_2S_2O_3$ | 0.13 |
| CaO | 0.06 |
| $Fe_2O_3$ | Below 0.01 |
| Oils | Below 0.001 |

Now here is another example where lime was used more than necessary for caustification of inorganic sodium salts in the same treatment process as the above example.

1000 kg. of the waste liquid composed as shown in Table 2 was added with lime solution (1000 kg. lime of 95% purity dissolved in 3450 kg. water) and 4500 kg. $Na_2SO_4 \cdot 10H_2O$ of 95% purity. While heating and agitating, the liquid was made to absorb $H_2S$ till it was supersaturated, and 6 kg. of insoluble impurities and about 260 kg. of $CaSO_4 \cdot 2H_2O$ were filtered. The resulting products were 58 kg. of oils and 598 kg. of sodium hydro-sulfide.

The analysis result of said sodium hydro-sulfide solution is as follows:

| | Percent |
|---|---|
| NaSH | 23.54 |
| NaOH | Below 0.01 |
| $Na_2CO_3$ | 0.19 |
| $Na_2SO_3$ | 0.09 |
| $Na_2SO_4$ | 0.71 |
| $Na_2S_2O_3$ | 0.15 |
| CaO | 0.10 |
| $Fe_2O_3$ | Below 0.01 |
| Oils | Below 0.001 |

As has been seen, this invention provides a method by which waste caustic soda having been very difficult to dispose of in the petroleum refinery is treated by the addition of $H_2S$ obtained from waste gas, and in addition, a useful by-product of reducing agent is obtained. Said waste caustic soda can be used as a treating liquid of $H_2S$, for it may be added with $H_2S$ obtained not only from the waste gas but also from any other origin. According to this invention, it may be said reasonable from an economical standpoint to use new caustic soda in treating waste gas containing hydrogen sulfide because of the valuable by-product obtained.

We claim:
1. A method of separating harmful, waste organic components from waste aqueous caustic soda solutions containing said components which are discharged from petroleum refining processes, which method comprises: (a) saturating said waste solutions with hydrogen sulfide gas, said saturation (1) converting all of the caustic soda solution to an aqueous solution of sodium hydrosulfide saturated with hydrogen sulfide and (2) causing the said organic components to separate from and float on the surface of the aqueous solution, and (b) separating the material in aqueous phase from the floating organic components.

2. A method as claimed in claim 1 wherein: (c) the waste aqueous caustic soda solution is causticized with a causticizing agent selected from the group consisting of calcium hydroxide, calcium oxide, barium hydroxide and barium oxide to causticize inorganic salts contained therein before being saturated with the hydrogen sulfide gas.

3. A method as claimed in claim 2 wherein precipitate produced by step (c) is removed from the solution before the said solution is saturated with the hydrogen sulfide gas.

4. A method of treating waste caustic solution and waste gas which are separately discharged from petroleum refining processes and which present disposal problems, said waste caustic solution containing caustic soda together with harmful organic waste matter therein and said waste gas comprising hydrogen sulfide gas, which method comprises: (a) saturating the said waste caustic solution with the said waste gas, said saturation (1) converting all of the caustic soda solution to an aqueous solution of sodium hydrosulfide saturated with hydrogen sulfide and (2) causing the said waste organic matter to separate from and float on the surface of the aqueous solution, (b) separating the material in aqueous phase from the floating organic matter, and (c) recovering a concentrate comprising essentially sodium hydrosulfide from the aqueous phase.

References Cited by the Examiner
UNITED STATES PATENTS

| | | | |
|---|---|---|---|
| 1,647,764 | 11/1927 | Allen | 23—185 |
| 2,346,550 | 4/1944 | Border et al. | 23—134 |
| 2,409,392 | 10/1946 | Saddington | 23—134 |
| 2,552,183 | 5/1951 | Knight | 23—185 |
| 2,662,000 | 12/1953 | Maschwitz | 23—134 |

OSCAR R. VERTIZ, *Primary Examiner.*

MAURICE A. BRINDISI, *Examiner.*

A. J. STEWART, O. F. CRUTCHFIELD,
*Assistant Examiners.*